365-121 SR

XR RE 28,971

PINK TX 94415

United St

Kumada et al.

Re. 28,971

Reissued Sept. 21, 1976

[54] LIGHT MODULATOR ELEMENT

[75] Inventors: Akio Kumada; Keiichiro Aizu; Yoshio Furuhata, all of Kodaira, Japan

[73] Assignee: Hitachi, Ltd., Tokyo, Japan

[22] Filed: Jan. 17, 1972

[21] Appl. No.: 218,567

Related U.S. Patent Documents

Reissue of:

[64] Patent No.: 3,586,415
Issued: June 22, 1971
Appl. No.: 810,161
Filed: Mar. 25, 1969

[30] Foreign Application Priority Data

Mar. 30, 1968 Japan ..... 43-20815
Mar. 30, 1968 Japan ..... 43-20816

[52] U.S. Cl. ..... 350/150; 340/173.2; 350/149; 350/157; 350/160 R

[51] Int. Cl.[2] ..... G02F 1/03

[58] Field of Search ..... 350/150, 149, 157, 160 R; 340/173.2

[56] References Cited

UNITED STATES PATENTS

| | | | |
|---|---|---|---|
| 3,374,473 | 3/1968 | Cummins | 350/150 X |
| 3,439,974 | 4/1969 | Henry et al. | 350/149 |

*Primary Examiner*—John K. Corbin
*Assistant Examiner*—Matthew W. Koren
*Attorney, Agent, or Firm*—Craig & Antonelli

[57] ABSTRACT

A device for modulating and a nondestructive readout storage device employing modulation of light transmitted through an irregular ferroelectric crystal before and after the rotation of the vibration plane thereof caused by an applied electric field equal to or larger than the coercive field thereof.

12 Claims, 17 Drawing Figures

INVENTORS
AKIO KUMADA
KEIICHIRO AIZU
YOSHIO FURUHATA

BY Craig, Antonelli, Stewart & Hill

ATTORNEYS

INVENTORS
AKIO KUMADA
KEIICHIRO AIZU
YOSHIO FURUHATA

BY Craig, Antonelli, Stewart & Hill

ATTORNEYS

INVENTORS
AKIO KUMADA
KEIICHIRO AIZU
YOSHIO FURUHATA

BY Craig, Antonelli, Stewart & Hill

ATTORNEYS

LIGHT MODULATOR ELEMENT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a light modulator utilizing the variation in the orientation of the vibration plane of an irregular ferroelectric crystal accompanying the polarization reversal thereof.

2. Description of the Prior Art

There are various conventional optical switching elements such as ammonium dihydrogen phosphate (hereinafter referred to as ADP) employing an electro-optical effect and Kerr cells employing birefringence caused when a substance such as nitrobenzene is placed in an electric field. All of these elements are such that the intensity of light transmitted through these elements is controlled by placing the elements between two polarizers the vibration planes of which are orthogonal and applying thereto an electric field. In such elements 1. The quantity of light transmitted therethrough is proportional to the applied field. A high voltage is necessary for intensifying the brightness of the transmitted light.

2. Since the quantity of transmitted light is proportional to the applied field, light is not transmitted when the applied voltage is reduced to zero, that is, these optical elements have no memory function. Therefore, in order to maintain the brightness at a constant value, it is necessary to keep the elements impressed with a voltage corresponding thereto.

SUMMARY OF THE INVENTION

It is an object of the present invention to provide an optical switching element having a memory function and capable of controlling switching time.

It is another object of the present invention to provide a ferroelectric storage device having no dependency on voltage, frequency and time.

It is a further object of the present invention to provide a storage device wherein information stored in a ferroelectric storage element is nondestructively read out.

It is still another object of the present invention to provide a large capacity storage device wherein information stored in a ferroelectric storage element is read out with a high S/N ratio.

DESCRIPTION OF THE PREFERRED EMBODIMENTS

Figure 1A:
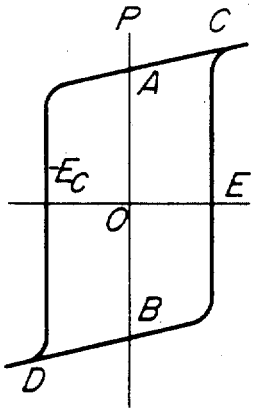
FIG. 1a is a hysteresis loop of polarization versus electric field of a ferroelectric material.

Ferroelectric material has generally a hysteresis characteristic as shown in FIG. 1a between an applied field E and an electric polarization P. In other words, as the electric field applied to the ferroelectric material grows high, the polarization of the ferroelectric material reaches the state indicated by CA in FIG. 1a. Then, as the applied field is gradually reduced, the polarization also becomes reduced, and when the applied field exceeds the negative coercive field $-E_c$ after having passed through zero, the polarization is reversed. As the intensity of the applied field is further increased in the negative direction, the polarization reaches the state indicated by DB in FIG. 1a.

According to studies on ferroelectrics made by the inventors it was found that some kinds of ferroelectrics such as potassium dihydrogen phosphate (hereinafter referred to as KDP) and gadolinium molybdenum oxide (hereinafter referred to as GMO) have the property that when a stress of more than a certain value (hereinafter referred to as coercive stress), to say nothing of an electric field of more than a certain value (hereinafter referred to as coercive field), is applied to the ferroelectrics, the direction of the spontaneous polarization 5 thereof is reversed and, at the same time, the crystal lattice thereof undergoes deformation as shown in FIGS. 2a and 2b as contrasted to the known ferroelectrics such as triglycine sulfate, lead zircon-titanate and barium titanate whose spontaneous polarizations are reversed in their direction by the application of the coercive field and which undergo no crystal lattice deformation.

Figure 2:
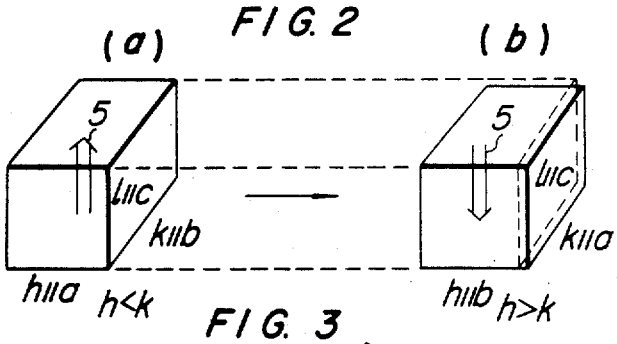
FIG. 2 is a diagram showing the change in the dimension of an irregular ferroelectric crystal wherein (a) is the state of the crystal with no stress nor applied electric field, and (b) is the state of the crystal with an applied electric field higher than the coercive field.

Generally, a crystal having an electric polarization called spontaneous polarization in the absence of stress and electric field and capable of being reversed in its spontaneous polarization depending on an applied electric field as shown in FIG. 1a is conventionally called a ferroelectric crystal. In some of the ferroelectric crystals, the strain in the crystal lattice is different depending on the direction of the spontaneous polarization as shown in FIG. 2. Such a ferroelectric crystal will hereinafter be referred to as an irregular ferroelectric crystal. The above-mentioned KDP and GMO are examples of irregular ferroelectric crystals. Irregular ferroelectrics belong to ferroelastoelectrics. In contrast, a ferroelectric crystal of which the strain in the lattice is independent of the direction of the spontaneous polarization is called a regular ferroelectric crystal. Referring to FIG. 2 in which h, k and l indicate the length of the edges of the crystal along the crystallographic axes a, b and c respectively, the crystal in the state (a) is expanded in a direction perpendicular to the sheet of the drawing, while in the state (b), it is elongated in the horizontal direction. That is, the crystal in the state (a) corresponds to that in the state (b) rotated 90° around the axis c. With this change in deformation, the tensorial properties of the crystal change accordingly.

Figure 1B:
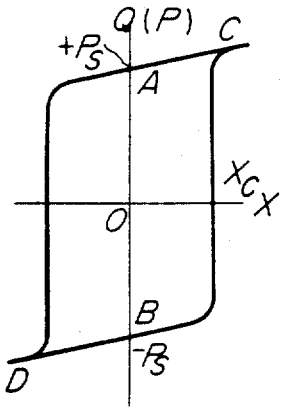
FIG. 1b is a hysteresis loop of generated electric charge versus stress of an irregular ferroelectric material.

There are basically two methods of transforming an irregular ferroelectric crystal from one state to the other. According to one method, a crystal which is in the state of FIG. 2a is give a compressive force in the direction of k to cause a strain. If the compressive force exceeds a certain value, the crystal will be transformed into the state of FIG. 2b, and the polarity of the electrification on both end surfaces perpendicular to the direction of the spontaneous polarization will be reversed. This phenomenon corresponds to the generation of electric charge or electromotive force due to a mechanical stress. In this case, the relation between the stress X and the charge density Q is expressed by a hysteresis loop as shown in FIG. 1b, and both polarized states opposite to each other are stable in the absence of an electric field or a mechanical stress. The other method of transforming the state of the crystal is to impose an electric field on the crystal in the direction opposite to that of the spontaneous polarization to reverse the polarization as described previously. Accompanying the reversal of the polarization there occurs a change in strain as shown in FIG. 2. In this case, the relation between the electric field and the mechanical strain is as shown in FIG. 1c.

Figure 1C:
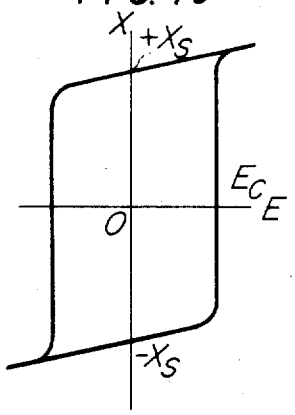
FIG. 1c is a hysteresis loop of mechanical strain versus electric field of an irregular ferroelectric material.

Needless to say, in an irregular ferroelectric crystal, the relation between the mechanical stress and strain also shows a hysteresis loop similar to those of FIGS. 1b and 1c. Such a mechanical behavior is entirely different from elasticity or plasticity of ordinary materials, and it is a property rather comparable with ferroelectricity or ferromagnetism. Therefore, it may be called "ferroelasticity," and an irregular ferroelectric crystal may be said to be ferroelectric as well as ferroelastic material. According to the investigation made by the inventors, it has been found that some crystals among the crystals belonging to the point groups mm2, 2-I and 2-II fall within the category of the irregular ferroelectric material. The following table I enumerates these crystals under the respective group indices imm2, i2-I and i2-II.

TABLE I

| Point group | Material |
|---|---|
| imm2 | KDP, GMO. |
| i2-I | Not yet discovered. |
| i2-II | Rochelle salt, cadmium ammonium sulfate, dodecylhydrate of aluminum methyl-ammonium sulfate. |

According to various investigations made by the inventors it has been found that GMO and its crystallographic isomorphs, that is, $[(R_xR'_{1-x})_2O_3Mo_{1-e}W_eO_3]$ $(R_x R'_{1-x})_2 O_3 . 3 Mo_{1-e} W_eO_3$ (where, R and R' are at least one element of the rare earths, x is a number of 0–1.0, and e is a number of 0–0.2) are crystals of the ferroelectric and ferroelastic phase belonging to point group mm2, have a curie temperature approximately at 1600° C. show irregular ferroelectric properties at temperatures ranging from the curie point to very low temperatures, including room temperature, are insoluble in water, resistive to moisture as well as desiccation, and have a high mechanical strength. Further, the curie point thereof can be lowered down to around room temperature by forming isomorphous solid solutions. A crystal of the GMO crystal structure employed in the present invention belongs to the orthorhombic system of crystal crystallography.

The unit cell dimensions of GMO used in this invention have been determined by using an X-ray goniometer and by an X-ray diffraction method, as follows:

a=10.38±0.005 A.

b=10.426±0.005 A.

c=10.709±0.005 A.

As to $Eu_2(MoO_4)_3$, $Tb_2(MoO_4)_3$, $Dy_2(MoO_4)_3$ and $Sm_2(MoO_4)_3$ which are isomorphous of GMO, it has been found from the measurement by an X-ray diffraction method that the unit cell dimension along the axis a is different from that along the axis b in all of these crystals as shown in table II.

TABLE II

| Material | a (A.) | b (A.) | c (A.) |
|---|---|---|---|
| $Eu_2(MoO_4)_3$ | 10.377±0.005 | 10.472±0.005 | 10.655±0.005 |
| $Gd_2(MoO_4)_3$ | 10.388±0.005 | 10.426±0.005 | 10.709±0.005 |
| $Dy_2(MoO_4)_3$ | 10.331±0.005 | 10.346±0.005 | 10.603±0.005 |
| $Sm_2(MoO_4)_3$ | 10.478±0.005 | 10.511±0.005 | 10.856±0.005 |

Each single crystal of GMO, $Sm_2(MoO_4)_3$, $Eu_2(MoO_4)_3$, $Tb_2(MoO_4)_3$ and $Dy_2(MoO_4)_3$ was cut in parallel with (100), (010), (001) planes which are perpendicular to the axes a, b, c, respectively, and was subjected to polling by being impressed with an electric field or a mechanical stress to be made into a single domain structure. (This was verified by observing 080) specimen through a polarizing microscope with plane polarized light directed in the direction of the axis c while manipulating a crossed polar.) The intensity distribution of light reflected from the surfaces of the crystal was measured with an X-ray three axes goniometer. The planes the reflected light from which was measured, were (400), (600), (800), (1000), and also (003), (004), (005). Further, after the measurement of the reflected light, the axes a and b of the crystal were interchanged by applying an inverse electric field in the direction of the axis c or by applying a stress in the direction of the axis c, and the crystal is made of a single domain. Then again, the intensity distribution of the light reflected from planes (040), (060), (080) and (0100) was determined under the following measuring condition. That is, Cu-K rays from an X-ray source energized with a voltage of 30 kv. and a current of 10 ma. were directed to the crystal through a divergence slit 10 mm. wide, a scattering slit 10 mm. wide and an entrance slit 0.1 mm. wide. The scanning speed of the goniometer was one-fourth degree/min. and the radius of a geiger counter used was 185 mm. Further, when the crystal was heated above the curie temperature thereby to release it from the polled state and then cooled, it became of a multidomain structure and the difference between the cell dimensions a and b became indistinct.

Some of the irregular ferroelectric crystals used in this invention are single crystals and solid solutions of chemical compounds of the GMO crystal structure. Several of them have been shown in table I.

The structure of such a crystal is greatly affected by the size of positive ions contained therein. If the positive ions are too large or too small, a different structure will result. The Arrhenius ion radii of ions of rare earths are as follows: $Sm^{+3}$: 1.00 A. $Eu^{+3}$: 0.98 A. $Gd^{+}$: 0.97 A. Tb: 0.93 A. and Dy: 0.92 A. Therefore, $(R_xR'_{11x})_2O_3 \cdot 3Mo_{11e}WeO_3$ $(R_x R'_{1-x})_2 O_3 \cdot 3 Mo_{1-e} W_eO_3$ formed with these ion radii will have the same GMO crystal structure.

The GMO crystal used in this invention belongs to the orthorhombic system and to the point group mm2 and has a spontaneous strain $x_S$ as follows:

$$x_s = \frac{b-a}{a+b} > 5\times10^{-4}$$

A crystal having such unit dimension is remarkably affected by the polling. The GMO crystal used in this invention has the following properties:

Color: Colorless and transparent
Density: 4,600 kg./m.$^3$
Point group: Orthorhombic, mm2, ferroelectric phase at temperatures below the curie point; Tetragonal, 42 m., paraelectric phase at temperatures above the curie point
Phase transition temp.: 162°±3°C.
Melting point: 1,170°C.
Cleavage plane: (110),(001)
Specific dielectric constants in the direction of axes a, b and c: $\epsilon_c$=10.5, $\epsilon_a \approx \epsilon_b$=9.5 (at 20°C.)
Spontaneous polarization: $1.86\times10^{-3}$(C/M$^2$)(axis c direction)
Spontaneous strain: $1.5\times$(C/m$^2$10$^{13}$)
Elastic compliance: $25\times10^{112}$(m$^2$/Newton)
Coercive field: $6\times10^5$(V/m$^2$)
Coercive stress: $1.4\times10^5$(Newton/m$^2$)
Electrical resistivity: higher than $10^{10}\Omega$ a
Resistivity to water and chemicals: Good
Efflorescence and diliquescene: None The following table III shows some of the isomorphs of GMO crystal used in this invention. Reactive materials and the amounts thereof required for forming the crystals also are shown in the table.

TABLE III

| Number | Chemical formula of single crystal | Reactive material (mixture ratio) Molybdate, parts | Rare earth | Parts |
|---|---|---|---|---|
| 2 | $Sn_2(MoO_4)_3$ | 431.8 | $Sm_2O_3$ | 348.7 |
| 3 | $Eu_2(MoO_4)_3$ | 431.8 | $Eu_2O_3$ | 352.0 |
| 4 | $Dy_2(MoO_4)_3$ | 431.8 | $Dy_2O_3$ | 373.0 |
| 5 | $Tb_2(MoO_4)_3$ | 833.6 | $Tb_2O_3$ | 748.8 |
| 6 | $(Gd_{0.5}Sm_{0.5})_2(MoO_4)_3$ | 431.8 | $Gd_2O_3$ | 180.9 |
| | | | $Sm_2O_3$ | 174.3 |
| 7 | $(Gd_{0.5}Eu_{0.5})_2(MoO_4)_3$ | 431.8 | $Gd_2O_3$ | 180.9 |
| | | | $Eu_2O_3$ | 176.0 |
| 8 | $(Gd_{0.5}Tb_{0.5})_2(MO_4)_3$ | 431.8 | $Gd_2O_3$ | 180.9 |
| | | | $Tb_4O_3$ | 187.2 |
| 9 | $(Gd_{0.5}Dy_{0.5})_2(MoO_4)_3$ | 431.8 | $Gd_2O_3$ | 180.9 |
| | | | $Dy_2O_3$ | 186.5 |
| 10 | $(Gd_{0.95}Yb_{0.68})_2(MoO_4)_3$ | 431.8 | $Gd_2O_3$ | 343.7 |
| | | | $Yb_2O_3$ | 19.7 |
| 11 | $(Gd_{0.95}Ho_{0.05})_2(MoO_4)_3$ | 431.8 | $Gd_2O_3$ | 343.7 |
| | | | $Ho_2O_3$ | 18.9 |
| 12 | $(Gd_{0.93}Lu_{0.03})_2(MoO_4)_3$ | 431.8 | $Gd_2O_3$ | 343.7 |
| | | | $Lu_2O_3$ | 19.9 |
| 13 | $(Gd_{0.95}Tm_{0.05})_2(MoO_4)_3$ | 431.8 | $Gd_2O_3$ | 343.7 |
| | | | $Tm_2O_3$ | 19.3 |
| 14 | $(Gd_{0.95}Sc_{0.05})_2(MoO_4)_3$ | 431.8 | $Gd_2O_3$ | 343.7 |
| | | | $Sc_2O_3$ | 6.9 |
| 15 | $(Gd_{0.95}La_{0.05})_2(MoO_4)_3$ | 431.8 | $Gd_2O_3$ | 343.9 |
| | | | $La_2O_3$ | 16.3 |
| 16 | $(Gd_{0.95}Pr_{0.05})_2(MoO_4)_3$ | 431.8 | $Gd_2O_3$ | 343.9 |
| | | | $Pr_5O_6$ | 17.0 |
| 17 | $(Gd_{0.5}Y_{0.4})_2(MoO_4)_3$ | 431.8 | $Gd_2O_3$ | 217.0 |
| | | | $Y_2O_3$ | 90.3 |
| 18 | $(Gd_{0.6}La_{0.4})_2(MoO_4)_3$ | 431.8 | $Gd_2O_3$ | 217 |
| | | | $La_2O_3$ | 130.0 |
| 19 | $(Gd_{0.60}Tb_{0.20}Dy_{0.20})_2(MoO_4)_3$ | 431.8 | $Gd_2O_3$ | 217 |
| | | | $Dy_2O_3$ | 74.6 |
| | | | $Tb_4O_3$ | 78.8 |
| 20 | $(Gd_{0.70}Eu_{0.20}Dy_{0.10})_2(MoO_4)_3$ | 431.8 | $Gd_2O_3$ | 235.3 |
| | | | $Eu_2O_3$ | 70.4 |
| | | | $Dy_2O_3$ | 37.3 |
| 21 | $(Gd_{0.60}Sm_{0.20}Tb_{0.10})_2(MoO_4)_3$ | 431.8 | $Gd_2O_3$ | 217.0 |
| | | | $Sm_2O_3$ | 69.7 |
| | | | $Tb_4O_7$ | 39.4 |

TABLE III-continued

| Number | Chemical formula of single crystal | Molybdate, parts | Reactive material (mixture ratio) Rare earth | Parts |
|---|---|---|---|---|
| 22 | $(Gd_{0.70}Eu_{0.20}Tb_{0.10})_2(MoO_4)_3$ | 431.8 | $Gd_2O_3$ | 253.3 |
| | | | $Eu_2O_3$ | 70.4 |
| | | | $Tb_4O_7$ | 39.4 |
| 23 | $(Gd_{0.7}Y_{0.2}La_{0.4})_2(MoO_4)_3$ | 431.8 | $Gd_2O_3$ | 253.3 |
| | | | $La_2O_3$ | 32.6 |
| | | | $Y_2O_3$ | 45.2 |
| 24 | $(Gd_{0.7}Eu_{0.20}Ho_{0.10})_2(MoO_4)_3$ | 431.8 | $Gd_2O_3$ | 253.3 |
| | | | $Eu_2O_3$ | 70.4 |
| | | | $Ho_2O_3$ | 37.8 |
| 25 | $(Gd_{0.7}Sm_{0.4}Eu_{0.4}Y_{0.4})_2(MoO_4)_3$ | $Eu_2O_3$ | $Gd_2O_3$ | 253.3 |
| | | | $Sm_2O_3$ | 34.9 |
| | | | 35.3 | |
| | | | $Y_2O_3$ | 22.6 |
| 26 | $(Gd_{0.95}Nd_{0.05})_2(MoO_4)_3$ | 431.8 | $Gd_2O_3$ | 343.7 |
| | | | $Nd_2O_3$ | 16.8 |
| 27 | $(Gd_{0.5}Tb_{0.2}Y_{0.1}La_{0.4})_2(MoO_4)_3$ | 431.8 | $Gd_2O_3$ | 217.0 |
| | | | $Tb_4O_7$ | 78.8 |
| | | | $Y_2O_3$ | 22.6 |
| | | | $La_2O_3$ | 32.6 |
| 28 | $Gd_2(Mo_{0.95}W_{0.1}O_4)_3(MoO_4)_3$ | | $WO_3$ | 70.0 |
| 29 | $(Sm_{0.5}Eu_{0.5})_2(MoO_4)_3$ | 431.8 | $Sm_2O_3$ | 174.1 |
| | | | $Eu_2O_3$ | 176.0 |
| 30 | $(Sm_{0.5}Dy_{0.5})_2(MoO_4)_3$ | 431.8 | $Sm_2O_3$ | 174.1 |
| | | | $Dy_2O_3$ | 186.5 |
| 31 | $(Sm_{0.5}Tb_{0.5})_2(MoO_4)_3$ | 431.8 | $Sm_2O_3$ | 174.1 |
| | | | $Tb_4O_7$ | 187.5 |
| 32 | $(Sm_{0.95}Yb_{0.05})_2(MoO_4)_4$ | 431.8 | $Sm_2O_3$ | 331.3 |
| | | | $Yb_2O_3$ | 18.7 |
| 33 | $(Sm_{0.95}Ho_{0.05})_2(MoO_4)_3$ | 431.8 | $Sm_2O_3$ | 331.3 |
| | | | $Ho_2O_3$ | 18.9 |
| 34 | $(Sm_{0.95}Lu_{0.05})_2(MoO_4)_3$ | 431.8 | $Sm_2O_3$ | 331.3 |
| | | | $Lu_2O_3$ | 19.9 |
| 35 | $(Sm_{0.95}Tm_{0.05})_2(MoO_4)_3$ | 431.8 | $Sm_2O_3$ | 331.3 |
| | | | $Tm_2O_3$ | 19.3 |
| 36 | $(Sm_{0.95}Sc_{0.05})_2(MoO_4)_3$ | 431.8 | $Sm_2O_3$ | 331.3 |
| | | | $Sc_2O_3$ | 6.9 |
| 37 | $(Sm_{0.95}Y_{0.03})_2(MoO_4)_3$ | 431.8 | $Sm_2O_3$ | 331.3 |
| | | | $Y_2O_3$ | 11.3 |
| 38 | $(Sm_{0.90}Er_{0.4})_2(MoO_4)_3$ | 431.8 | $Sm_2O_3$ | 313.4 |
| | | | $Er_2O_3$ | 19.1 |
| 39 | $(Sm_{0.5}Eu_{0.3}Er_{0.4})_2(MoO_4)_3$ | 431.8 | $Sm_2O_3$ | 209.4 |
| | | | $Er_2O_3$ | 105.4 |
| | | | $Er_2O_3$ | 19.1 |
| 40 | $(SM_{0.7}Tb_{0.2}Y_{0.4})_2(MoO_4)_3$ | 431.8 | $Sm_2O_3$ | 244.0 |
| | | | $Tb_4O_7$ | 78.8 |
| | | | $Y_2O_3$ | 22.6 |
| 41 | $(Sm_{0.8}Er_{0.4}Y_{0.4})_2(MoO_4)_3$ | 431.8 | $Sm_2O_3$ | 278.9 |
| | | | $Y_2O_3$ | 22.6 |
| | | | $Er_2O_3$ | 19.1 |
| 42 | $(Sm_{0.8}Dy_{0.1}Y_{0.05}Er_{0.05})_2(MoO_4)_3$ | 431.8 | $Sm_2O_3$ | 278.9 |
| | | | $Dy_2O_3$ | 37.3 |
| | | | $Y_2O_3$ | 11.3 |
| | | | $Er_2O_3$ | 9.5 |
| 43 | $(Sm_{0.5}Tb_{0.5})_2(Mo_{0.90}W_{0.1})_3$ | 388.6 | $WO_3$ | 70.0 |
| | | | $Sm_2O_3$ | 174.1 |
| | | | $Tb_4O_7$ | 187.2 |
| 44 | $(Dy_{0.95}La_{0.05})_2(MoO_4)_3$ | 431.8 | $Dy_2O_3$ | 369.3 |
| | | | $La_2O_3$ | 16.3 |
| 45 | $(Dy_{0.95}Pr_{0.05})_2(MoO_4)_3$ | 431.8 | $Dy_2O_2$ | 369.3 |
| | | | $Pr_5O_{11}$ | 17.0 |
| 46 | $(Dy_{.95}Nd_{0.05})_2(MoO_4)_3$ | 431.8 | $Nd_2O_3$ | 16.8 |
| | | | $Dy_2O_3$ | 369.3 |
| 47 | $(Dy_{0.3}Nd_{0.10}Ho_{0.40})_2(MoO_4)_3$ | 431.8 | $Dy_2O_3$ | 298.4 |
| | | | $Ho_2O_3$ | 37.8 |
| | | | $Nd_2O_3$ | 33.7 |
| 48 | $(Eu_{0.5}Tb_{0.04}Dy_{0.2})_2(MoO_4)_3$ | 431.8 | $Eu_2O_3$ | 211.2 |
| | | | $Dy_2O_1$ | 74.6 |
| | | | $Tb_4O_8$ | 102.4 |

TABLE III-continued

| Number | Chemical formula of single crystal | Molybdate, parts | Reactive material (mixture ratio) Rare earth | Parts |
|---|---|---|---|---|
| 49 | $(Gd_{0.5}Eu_{0.7}Sm_{0.1}Tb_{0.4}Dy_{0.1})_1(MoO_4)_3$ | 431.8 | $Gd_2O_3$ | 217.0 |
| | | | $Sm_2O_3$ | 34.9 |
| | | | $Eu_2O_3$ | 70.4 |
| | | | $Dy_2O_3$ | 37.3 |
| | | | $Tb_4O_7$ | 39.4 |

Figure 3:
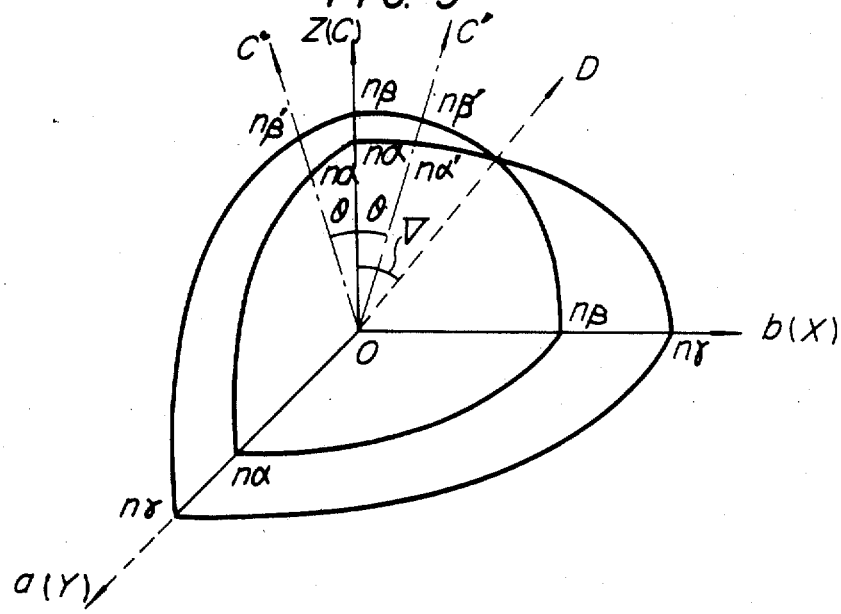
FIG. 3 is a part of the indicatrix ellipsoid of a biaxial birefringent crystal.

The irregular ferroelectric crystals as listed above are positively biaxial and birefringent in the ferroelectric phase. FIG. 3 shows a part of the indicatric ellipsoid (or, in other words, light velocity ellipsoid) of such a crystal. In FIG. 3, axes X, Y, Z indicate optoelastic principal axes, and $n_\alpha$, $n_\beta$, $n_\gamma$ indicate refractive indices of light vibrating parallel to the axes, X, Y, Z, respectively.

In a GMO crystal, the optoelastic principal axes X, Y, Z coincide with the crystallographic axes a, b, c, respectively. The crystal is uniaxially birefringent at temperatures above the curie point (approximately 160°C.), and its refractive indices with respect to sodium D line, λ=5,893 A, at 200°C. are as follows:

$$N_e=1.848, \qquad N_o=1.901$$

The crystal shows the irregular ferroelectric characteristics at temperatures below the curie point and becomes biaxially birefringent.

The optical axial angle 2 V (two times the angle V in FIG. 3) and refractive indices $n_\alpha$, $n_\beta$, $n_\gamma$ of the crystal against Na-D line at room temperature are as follows:

$$2V \approx 11.0°$$
$$N_\alpha = 1.842$$
$$N_\beta = 1.843$$
$$N_\gamma = 1.897$$
$$N_\beta - N_\alpha \approx 4\times10^{14}$$

The optical axial plane of this biaxial positive crystal is the crystallographic a plane (100), and this plane will rotate 90° around the axis c if the crystal is polarized reversely. Consequently, as is evident from FIG. 3, the retardation $R_a$ of light transmitted through the GMO crystal in the direction of the axis a is given by the formula, $$R_a=d_a(N\gamma - n_\alpha)$$

where $d_\alpha$ is the thickness of the crystal in the direction of axis a. If a polarization reversal occurs in such a crystal and the optoaxial plane rotates 90° around the axis c, the axis a is replaced by the axis b and the axis b by the axis a. Therefore, the above-mentioned retardation also changes to the following value.

$$R_b=d_b(N_\gamma - N_\beta)$$

(The charge in the thickness of the crystal is due to the deformation of the unit cell equivalent to the 90° rotation of the axes a and b of the cell.) That is, the thickness as well as refractive index of the crystal changes with the polarization reversal and accordingly the retardation also changes.

The retardation across a distance d of the light incident upon the crystal in the direction at an angle θ to the axis c, for example, is $d(n_\beta - n_\alpha')$. In this case, if the crystal is reversely polarized, the above-mentioned retardation will become $d(n_\beta' - n_\gamma)$ which is equivalent to the retardation of light propagating in the direction oc'' which is on the plane ac and makes the angle θ with the axis c as shown in FIG. 3, since it can be deemed that the optoaxial plane (a-plane) of the crystal has been rotated 90° around the axis c.

Figure 4:
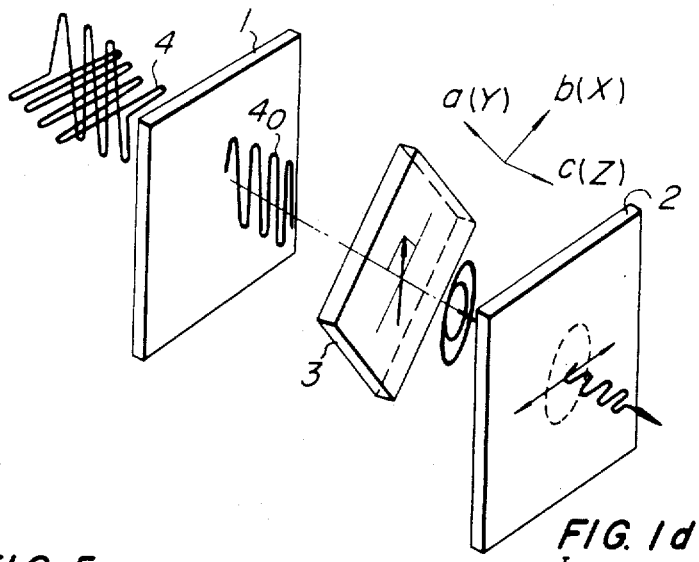
FIG. 4 is a diagram schematically showing how white light is polarized.

If a crystal 3 as described above is positioned between two parallel polarizing plates 1 and 2 as shown in FIG. 4 and white light 4 is directed perpendicularly to the polarizer 1, the white light $4_o$ linearly polarized through the polarizer 1 is refracted by the birefringence of the crystal 3 in various degrees depending on the component wavelength thereof, becoming circularly polarized light at a certain frequency, linearly polarized light at another frequency and elliptically polarized light at the other frequencies. Of the elliptically polarized light, only the light having the same vibration plane as that of the analzyer 2 passes through the analyzer 2 and gives an interference color. It should be noted that if the crystal is reversely polarized, thereby varying the retardation as described previously, the above-mentioned interference color also varies according to the change in the retardation.

Figure 5:
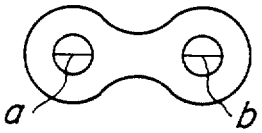
FIG. 5 is a diagram showing the state of interference of the light passed through the device of FIG. 4.
Figure 6:
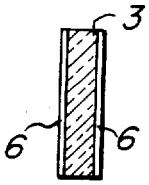
FIG. 6 is a crystal element used for an optical shutter device.

As stated above, irregular ferroelectric crystals such as GMO are biaxially and positively birefringent. Consequently, if monochromatic parallel rays of light 4 are directed to an arrangement where in a Z-cut (cut perpendicularly to the c-axis) plate 3 of the crystal is disposed, as shown in FIG. 4, between a ploarizer 1 and an analyzer 2 the polarization planes of which are perpendicular to each other, an interference pattern as shown in FIG. 5 is formed on a screen. The interference pattern of FIG. 5 is loci of interference images formed according to whether the difference between the optical paths of the refracted rays of the monochromatic rays of light (wavelength: λ) passed through the crystal plate 3 is an even number times the half wavelength ½λ or an odd number times the half wavelength ½λ. The phase difference R between two extraordinary rays is $$R=d(n_o-n_e)$$

where d is the thickness of the crystal plate 3, and $n_o$ and $n_e$ are refractive indices of the extraordinary rays, respectively. The spaces between the interference fringes depend on the thickness d of the crystal plate, and become narrower as the thickness of the crystal plate is larger.

Since the refractive index varies with the wavelength, the positions of the interference fringes of FIG. 5 vary with the wavelength.

If the Z-cut crystal plate 3 in FIG. 4 is provided with transparent electrodes 6 on both its Z-planes, i.e., c-planes, and if the crystal plate 3 is rotated around the c-axis so that the optoaxial plane thereof coincides with the vibration plane of the polarizer, the screen becomes dark. A diaphragm or stop may be employed in this arrangement to improve the parallelism of rays of light and the variation in brightness.

If the crystal plate 3 is rotated an angle $\theta$ from the dark state of the screen around the c-axis, the relation between the quantity of the transmitted light I and the rotation angle $\theta$ is $$I=I_o(1-\alpha\cos^2 2\theta)$$

where $I_o$ is the quantity of the transmitted light when $\theta=\pi/4$. Thus, when $$\theta=\pi/2, \quad I=I_o(1+\alpha)$$
$$\theta=\pi/4, \quad I=I_o$$
$$\theta=0, \quad I=I_o(1-\alpha)$$

When the spontaneous polarization of the crystal 3 is reversed by the application of a negative voltage, the optical axis plane thereof rotates 90°. The variation in the quantity of the transmitted light at this time is the same as that when the crystal is rotated 90° around the c-axis, and if the spontaneous strain is neglected, the variation in the brightness of the transmitted light can easily be detected. $\alpha$ changes depending on the angles between the plane perpendicular to the optical axis and the a- and b-axes.

Consequently, if the analyzer 2 is removed, the vibrating direction of incident linearly polarized light can be rotated 90°. If the analyzer 2 is employed, the quantity of the transmitted light can be varied between abundant and scanty states by a voltage at least equal to the coercive field.

If the crystal 3 in FIG. 4 is one which is cut perpendicularly to the optical axis, the birefringence does not take place in the direction of the optical axis. However, if the polarization state of the crystal is reversed, the birefringence takes place since the optoaxial plane rotates 90°.

By providing transparent electrodes in the matrix form to both surfaces of an irregular ferroelectric crystal plate element such as a GMO crystal element, and by applying a required voltage (at least equal to the coercive field of the crystal) to each transparent electrode, required information can be stored at each position of each matrix element in terms of "1" corresponding to the $+P_s$ state of the spontaneous polarization as shown in FIG. 1b and "0" corresponding to $-P_s$ state. If light is passed through such elements each storing information, the quantity of the light passed through the elements differs from element to element depending on the polarized state thereof. Thus, the stored information can be read out nondestructively with light. Such readout is of a high S/N ratio, and a small sized large capacity storage device can be made of an irregular ferroelectric crystal.

Some embodiments of the invention will now be described.

EXAMPLE 1

Figure 1D:
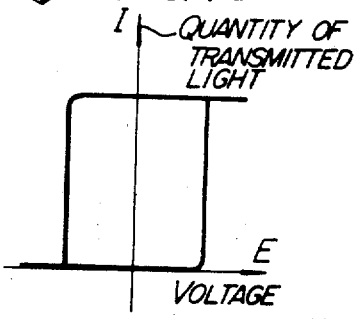
FIG. 1d is a quantity of transmitted light versus voltage characteristic of an irregular ferroelectric material.
Figure 7:
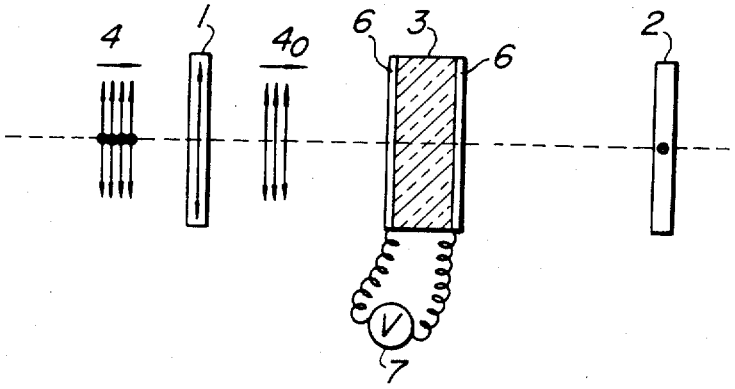
FIG. 7 is an embodiment of the optical shutter device according to the invention.

As shown in FIG. 7, a plate 3 of GMO single crystal in Z-cut with a thickness of 0.65 mm. provided with transparent electrodes 6 formed of, for example, $SnO_2$ or $InO_2$ on each c-plates thereof having an area 10 mm. × 10 mm. is disposed between a polarizer 1 and an analyzer 2. The b-axis of the crystal 3 forms an angle 25° with the vibration direction of the polarizer 1 and the angle between the vibration directions of the polarizer 1 and the analyzer 2 is 45°. Collimated monochromatic light 4 of a wavelength $\lambda$=550 m$\mu$ is directed to the crystal plate 3 through the polarizer 1. The light 4 changes into linearly polarized light $4_o$ by passing through the polarizer 1. At this time, if the voltage (300 volts) applied to the crystal plate 3 is adjusted by means of a controller associated with a voltage source 7, the arrangement can be used as a light modulator or an optical shutter. The relation between the quantity of the transmitted light and the applied voltage is as shown in FIG. 1d. Alternatively, if the analyzer 2 is eliminated from the arrangement of FIG. 7, the arrangement is used as a polarization plane rotating element for rotating the polarization plane of linearly polarized light by 90°.

EXAMPLE 2

If, a crystal plate 3, having an appropriate thickness is used, interference fringes as shown in FIG. 5 are observed. The crystal plate 3 employed in this embodiment is arranged in such a manner that the optical axis of the crystal 3 coincides with or is slight oblique to the optical axis of the entire arrangement. Or alternatively, a crystal 3 cut perpendicularly to the optical axis thereof and provided with transparent electrodes on both cut surfaces is employed and light is directed thereto perpendicularly or slightly obliquely to the cut surfaces. Then, the quantity of transmitted light is null, or when polarization reversal is caused by applying an electric field thereto, the quantity of the transmitted light increases.

Analogously to ferroelectrics ferroelastics are conceivable. Materials having two or more states (orientations) of different strain in the absence of any stress and capable of performing transition between these states by the application of strain are called ferroelastics herein. Ferroelastics generally have rectangular strain $\chi$ versus stress X hysteresis loops in the absence of applied electric field similar to the hysteresis loops shown in FIGS. 1a to 1c.

In FIGS. 1a or 1b, curve AC corresponds to one oriented state, and curve DB corresponds to the other oriented state. The former is called "1" state and the latter is called "0" state herein. One-half of the difference between polarizations in both states or $P_s$ or one-half of the difference between strains or $\chi_s$ is the absence of both electric field and stress are called spontaneous polarization and spontaneous strain, respectively. The electric field $E_c$ and stress $\chi_c$ necessary for the transition from "0" state to "1" state or vice versa are called coercive field and coercive stress, respectively.

[195] Irregular ferroelectrics such as GMO are not only ferroelectrics, but also ferroelastics. The kind and direction of an applied stress for the transistion of ferroelastic state are as follows: If the z-axis is established parallel to the $\bar{4}$ symmetry axis in the ordinary elastic phase (the phase above the curie temperature), and the x- and y-axes are established perpendicularly to two symmetry planes, a unit cell in the ferroelectric phase (the phase below the curie temperature) orientates as shown by A and B in FIG. 1a or 1b in "0" state and in "1" state. Therefore, in order to make transition from "0" state to "1" state, it may well be that a pressure is applied to the crystal plane perpendicular to the x-axis and/or a tension is applied to the crystal plane perpendicular to the y-axis. Or it may be good to apply shearing to the crystal along two pairs of crystal planes forming an angle of 45° with both x- and y-axes. In order to make transition from "1" state to "0" state, it may be good to apply a pressure to the crystal plane perpendicular to the y-axis, and/or to apply a tension to the crystal plane perpendicular to the x-axis. Or it may be good to apply shearing opposite to the above-mentioned shearing to the crystal along two pairs of crystal planes forming an angle of 45° with both x- and y-axes.

Figure 12:
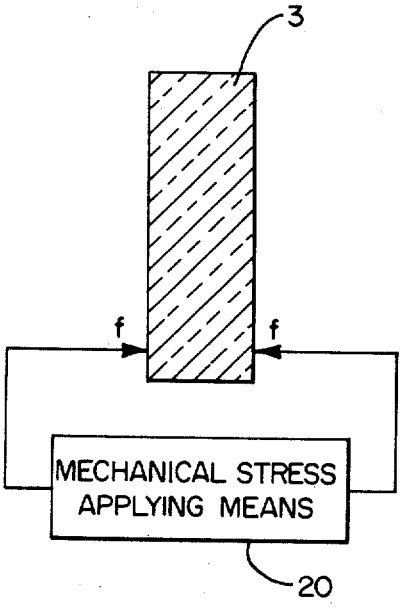
*FIG. 12 illustrates an embodiment of the invention employing mechanical stress applying means.*

*FIG. 12 illustrates a crystal 3 to which mechanical stress applying means 20 is coupled to apply forces as shown by the arrows f, in conjunction with the above description.*

Even if the configuration of the crystal element is such that there is no crystal face perpendicular to or forming an angle of 45° with the x- or y-axis, it is possible to cause a transition of state by a stress. The kind and direction of an effective applied stress are determined as the case may be.

Since GMO has a spontaneous polarization the direction of which varies with the transition of state, the spontaneous polarization is apt to electrostatically react to the transition of state due to stress. However, this reaction can be eliminated by applying a pair of electrodes to appropriate crystal faces and by short-circuiting them.

The spontaneous strain $\chi_s$ of GMO is defined by $$\chi_s=(|\chi_{22}-\chi|)/2$$

where $\chi_{11}$ and $\chi_{22}$ are expansion coefficients of the crystal in the x- and y-directions, respectively.

Ferroelastics other than GMO are:

Potassium dihydrogen phosphate $KH_2PO_4$(−150°C. or lower)

Dideuterate of ammonium arsenate $(ND_4)D_2AsO_4$(27°C. or lower)

Rochelle salt $KnaC_4H_4O_6.4H_2O$ (between 24°C. and −180°C. inclusive)

Cadmium ammonium sulfate $(NH_4)_2Cd_2(SO_4)_3$(−178°C. or lower)

Dodecylhydrate of aluminum methyl-ammonium sulfate (−96°C. or lower)

Generally, ferroelectrics vary in their refractive index by the transition of state.

An embodiment of the invention based on the above-described property of ferroelastics will now be described.

EXAMPLE 3

Figure 8:
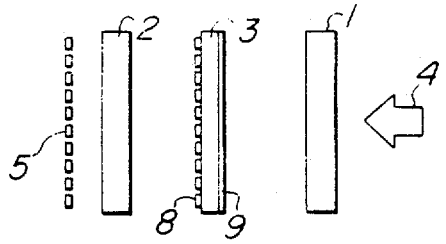
FIG. 8 is another embodiment of the invention.
Figure 9:
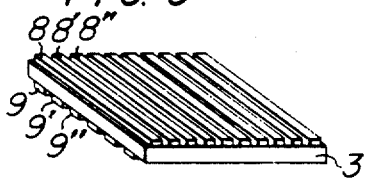
FIG. 9 is an arrangement of electrodes on a storage element according to the invention.
Figure 10:
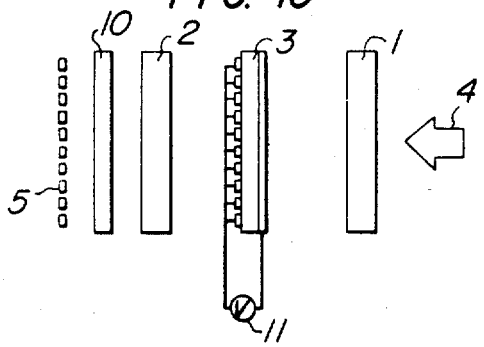
FIG. 10 is still another embodiment of the invention.

A storage unit 3 is disposed between a polarizer 1 and an analyzer 2 the polarization planes of which are perpendicular to each other as shown in FIG. 8. The storage unit 3 is cut out from a GMO single crystal in such a manner that its two main surfaces are perpendicular or slightly oblique to its optical axis with a distance of 100 microns therebetween. The storage unit 3 is then provided on its main surfaces, after the main surfaces are polished, with groups of transparent electrodes 8, 8′, 8″, —; 9, 9′, 9″, —made of $SnO_2$ or $InO_2$ each having a width of 1 mm. The groups of electrodes 8, 8′, 8″,—; 9, 9,′, 9″, —are arranged so that they are in a row and column relation to each other as shown in FIG. 9. A voltage source 11 for supplying a negative voltage of one-half of the coercive field $E_c$ of the crystal is connected to the electrodes as shown in FIG. 10. Each group of the transparent electrodes consisted of ten electrodes in this embodiment, thus providing a 10×10 bits storage device having $10^2$ storage elements.

Of course, a storage device having $10^2$ storage elements is not a large capacity storage device. Furthermore, the size 1 mm. × 1 mm. of the element corresponding to one bit is rather large. If a large capacity storage device of the order of $10^6$ bits, for example, is intended, the size of the storage device will be large.

Since conventional phototransistors having a diameter 1 mm. were employed as detectors in this example, the number of storage elements was limited to $10^2$. If a large capacity storage device having, for example, $10^6$ elements is desired, it may be well to form a number of microminiature phototransistors in a crystal surface by integrated circuit techniques.

The storage elements can store information by the application of a desired signal, for example a pulse of +120 volts with a duration of 10 microseconds to the electrodes 8, 8′, 8″, —; 9, 9′, 9″, —. The readout of the stored information is made by directing light through the polarizer 1 to the storage device 3 and detecting the light passed through the element by the phototransistor 5 through the analyzer 2. The light passed through the element is strong when the element stores "1" and faint when it stores "0."

The above-described readout of stored information was in terms of an analog quantity, i.e. brightness of light. However, the readout of the stored information can be made in terms of a digital quantity, wavelength of light.

In FIG. 4, if a GMO crystal 3 is arranged so that the z-axis thereof is in parallel with white light, it will be lightly colored. The GMO crystal is biaxial at room temperature and the optical axes thereof intersect the x-axis symmetrically to each other. The optical axis angle of the GMO crystal is about 11 at room temperature and 0° at the curie temperature and becomes uniaxial.

By the arrangement of FIG. 4 at room temperature, interference fringes are observed around the two optoaxial points a and b shown in FIG. 5, and the surroundings of the interference fringes are colored. The interference fringes are considered to be loci of the retardation. Since the retardation R has the relation $R=d(n_e\sim n_o)$ with the thickness d of the crystal and the refractive indices $n_o$ and $n_e$ of the two extraordinary rays, the difference $\Delta n=n_e\sim n_o$ between the refractive indices is zero in the direction of the optical axis, and the difference $\Delta n$ becomes larger as the departure from the optical axis becomes larger.

The interference color is determined by the retardation R. Bright colors result on the interval of the retardation R of 400 mμ and 800 mμ. When the retardation R is in the vicinity of 800 mμ, the color is red, and when the retardation R is near to 400 mμ, the interference color is blue. Since the difference $\Delta n$ varies with the solid angle around the optical axis at a given thickness of a crystal, the color of the light having passed through the crystal varies accordingly. Consequently, if the optical axis of the crystal is appropriately inclined relative to rays of light in accordance with the thickness of the crystal, a desired color of light can be obtained. If the crystal is fixed and the optoaxial plane is rotated by the polarization reversal, the color of light generally changes. It is easier to discern the two colors when the wavelengths thereof are different as far as possible.

The angle of the optical axis of the crystal relative to incident light can effectively be selected by observing the interference color which is the locus of the retardation R shown in FIG. 5. For example, if a c-crystal plate 0.2 mm. thick is set at 11° in the direction of the axis b, and 7° in the direction of the axis a in the single domain state, the color is red in the $+P_s$ state and blue in the $-P_s$ state.

Therefore, if the storage device 3 in FIG. 8 is replaced by a storage device made of such a crystal, the contents of the store can directly be identified. Further, if photodiodes having different sensitivity to two wavelengths indicating the contents of store are employed, or if photodiodes having sensitivity only to either one of the wavelengths are employed, the contents of the store can be read out with an electrical signal having a good signal to noise ratio.

The signal to noise ratio of the readout signal can greatly be increased by inserting a quarter wavelength plate 10 for the central wavelength of white light between the analyzer 2 and the phototransistors 5 in FIG. 10.

As has been described above, the storage device according to this invention is made of an irregular ferroelectric or ferroelastic material such as GMO, and the information stored in the storage elements of the storage device is read out by passing polarized light through the storage elements.

When a ferroelectric material is employed as the storage device, there are the advantages that (1) the power consumption of the storage element is small, and (2) a small sized large capacity storage device can be fabricated since the storage density can be made large.

Figure 11A:
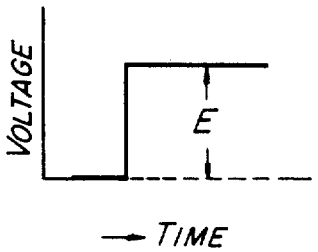
FIG. 11a is a wave form of a readout signal.
Figure 11B:
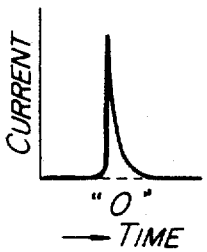
FIG. 11b is a current versus time characteristic of a readout current when a storage element is in a "0" state.
Figure 11C:
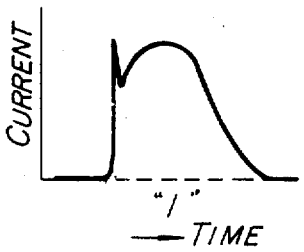
FIG. 11c is a current versus time characteristic of a readout current when a storage element is in a "1" state.

However, since a storage device employing ferroelectric material stores signals as polarized states of its storage matrix elements corresponding to respective signals by being supplied with predetermined signals, the information stored in the storage elements is read out by being supplied with definite reverse voltage pulses. When a pulse as shown in FIG. 11a is fed to a storage element for such reading out, only a low current as shown in FIG. 11b flows through the storage element if the polarity of the pulse is the same as the polarized state of the element. However, if the pulse is of opposite polarity with a sufficiently large amplitude, the polarized state of the element is reversed, accompanied by a relatively high current as shown in FIG. 11c flowing through the storage element to read out the information (i.e., polarized state) stored in the element.

The ferroelectric materials conventionally employed for such storage device were barium titanate and glycine sulfate, for example. In these ferroelectrics, there exists no coercive field corresponding to the threshold field $E_c$ for reversing the polarized state in the P-E hysteresis loop as shown in FIG. 1a. This is because, since the coercive field generally has dependency on voltage, frequency, and time, even a low voltage pulse can cause the crystal to reverse its polarization when it is applied to the crystal for a long time. That is, the coercive field is substantially zero against a quasi-static change in electric field, according to which the memory state of the crystal is apt to be unstable.

Further, since it is necessary to apply a pulse of reverse voltage to a storage element in order to read out the information stored therein, the stored information is destroyed due to the polarization reversal. Consequently, stored information cannot repeatedly be read out.

Still further, in such a reading method, all the elements of the i-th row and the j-th column are impressed with one-half the negative voltage necessary for reading out an element (the threshold voltage) in order to read the element at (i,j), for example. Although this voltage is smaller than the threshold value necessary for polarization reversal, i.e., the coercive field, the polarization reversal occurs gradually to cause a noise current since the coercive field of the conventional ferroelectric material has not a definite threshold value. Even when the polarization reversal does not occur but merely a charging current flows, the current becomes a cause of noise, and hence the S/N ratio becomes low and a large capacity storage device is difficult to fabricate.

However, if an optical shutter element utilizing the change in polarized state of an irregular ferroelectric or ferroelastic material such as GMO is employed as a storage element as in the present invention, nondestructive readout can be effected and the S/N ratio of readout is made large, thus making it possible to fabricate a large capacity storage device.

We claim:

[ 1. A device for modulating a beam of light comprising a pair of light polarizer plates disposed substantially in parallel with each other and having their surfaces substantially perpendicular to the direction of incident light thereon an irreguar ferroelectric element having a pair of Z-cut planes, said irregular ferroelectric element being arranged between said pair of light polarizer plates in such a manner that said Z-cut planes of said element are substantially parallel to said light polarizer plates, a pair of transparent electrodes each provided on each of said pair of Z-cut planes, and means for applying an electric field not lower than the coercive field of said element across said element through said pair of transparent electrodes. ]

[ 2. A device according to claim 1, further comprising a quarter wavelength plate for the central wavelength of white light. ]

[ 3. A device according to claim 1, wherein said irregular ferroelectric material is a single crystal having molybdate gadolinium oxide structure represented by $(R_xR'_{1-x})_2O_3.3Mo_{1-e}W_eO_3$, where R and R' are at least one element of the rare earths, x is a number of from 0 to 1.0, and e is a number of from 0 to 0.2. ]

[ 4. A device according to claim 1, wherein each of said pairs of transparent electrodes comprises a plurality of parallel strips at equal intervals, said strips comprising oppositely biased electrodes crossing over substantially perpendicularly to each other. ]

[ 5. A device according to claim 4, wherein said electrodes are made of one of $SnO_3$ and $InO_2$. ]

*6. A device for modulating a beam of light comprising:*

*a pair of light polarizer plates disposed substantially in parallel with each other;*

*an irregular ferroelectric element having a pair of Z-cut planes;*

*a pair of transparent electrodes each provided on each of said pair of Z-cut planes; and*

*means for applying an electric field not lower than the coercive field of said element across said element through said pair of transparent electrodes, said irregular ferroelectric element being made of molyb-* date gadolinium oxide crystal structure given by the formula $$R_2O_3 \cdot 3\ Mo_{1-e}W_eO_3$$

where e is a number of from 0 to 0.2, and R is an element selected from the group consisting of Sm, Tb, Dy and Eu.

7. A device for modulating a beam of light comprising:

a pair of light polarizer plates disposed substantially in parallel with each other;

an irregular ferroelectric element having a pair of Z-cut planes;

a pair of transparent electrodes each provided on each of said pair of Z-cut planes; and means for applying an electric field not lower than the coercive field of said element across said element through said pair of transparent electrodes, said irregular ferroelectric element being made of molybdate gadolinium oxide crystal structure given by the formula $$(R_xR'_{1-x})_2O_3 \cdot 3Mo_{1-e}W_eO_3$$

where R is constituted by at least one element selected from the group consisting of Y, La, Ce, Pr, Nd, Pm, Sm, Dy, Eu, Tb, Tm, Yb, and Lu, R' is constituted by at least one element selected from the group consisting of Y, La, Ce, Pr, Nd, Pm, Sm, Dy, Gd, Eu, Tb, Tm, Yb, and Lu, x is a number of from 0 to 0.1 and e is a number of from 0 to 0.2.

8. A birefringent device comprising:

a crystal element made of molybdate gadolinium oxide crystal structure given by the formula $$R_2O_3 3\ Mo_{1-e}W_eO_3,$$

where e is a number of from 0 to 0.2, and R is an element selected from the group of Sm, Tb, Dy and Eu; and means, connected to said crystal, for placing said crystal in one of the reversibly birefringent states thereof.

9. A device according to claim 8, wherein said means for placing said crystal in one of the reversibly birefringent states thereof comprises means for imparting a mechanical stress to the crystal at least equal to the coercive stress thereof.

10. A device according to claim 8, wherein said means for placing said crystal in one of the reversible birefringent states thereof comprises means for applying an electric field across said crystal at least equal to the coercive field of said crystal.

11. A device according to claim 10, wherein said means for applying an electric field comprises a voltage source and a pair of electrodes connected to said crystal for receiving the voltage from said voltage source and applying said electric field across said crystal.

12. A device according to claim 10, wherein said means for placing said crystal in one of the reversibly birefringent states thereof comprises means for applying a voltage pulse to said crystal.

13. A birefringent device comprising:

a crystal element made of molybdate gadolinium oxide crystal structure given by the formula $$(R_xR'_{1-x})_2O_3 \cdot 3Mo_{1-3}W_eO_3$$

where R is constituted by at least one element selected from the group consisting of Y, La, Ce, Pr, Nd, Pm, Sm, Dy, Eu, Tb, Tm, Yb, and Lu, R' is constituted by at least one element selected from the group consisting of Y, La, Ce, Pr, Nd, Pm, Sm, Dy, Gd, Eu, Tb, Tm, Yb, and Lu, x is a number of from 0 to 0.1 and e is a number of from 0 to 0.2; and means connected to said crystal, for placing said crystal in one of the reversibly birefringent states thereof.

14. A device according to claim 13, wherein said means for placing said crystal in one of the reversibly birefringent states thereof comprises means for imparting a mechanical stress to the crystal at least equal to the coercive stress thereof.

15. A device according to claim 13, wherein said means for placing said crystal in one of the reversible birefringent states thereof comprises means for applying an electric field across said crystal at least equal to the coercive electric field of said crystal.

16. A device according to claim 15, wherein said means for applying an electric field comprises a voltage source and a pair of electrodes connected to said crystal for receiving the voltage from said voltage source and applying said electric field across said crystal.

17. A device according to claim 15, wherein said means for placing said crystal in one of the reversibly birefringent states thereof comprises means for applying a voltage pulse to said crystal.

* * * * *